(12) United States Patent
Lum et al.

(10) Patent No.: US 9,098,924 B2
(45) Date of Patent: Aug. 4, 2015

(54) TECHNIQUES FOR OPTIMIZING STENCIL BUFFERS

(71) Applicant: NVIDIA CORPORATION, Santa Clara, CA (US)

(72) Inventors: Eric B. Lum, San Jose, CA (US); Jerome F. Duluk, Jr., Palo Alto, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 80 days.

(21) Appl. No.: 13/942,415

(22) Filed: Jul. 15, 2013

(65) Prior Publication Data

US 2015/0015594 A1 Jan. 15, 2015

(51) Int. Cl.
*G06F 12/02* (2006.01)
*G06T 1/60* (2006.01)

(52) U.S. Cl.
CPC .......................... *G06T 1/60* (2013.01)

(58) Field of Classification Search
CPC .................. G06T 1/60; G06T 15/00–15/005; G09G 5/00–5/008; G09G 5/02–5/028; G09G 5/39; G06F 12/02–12/0292
USPC ................. 345/419, 530, 531, 544, 589, 614
See application file for complete search history.

(56) References Cited

U.S. PATENT DOCUMENTS

| 7,999,820 B1 * | 8/2011 | Weitkemper et al. ......... 345/566 |
| 2008/0225049 A1 * | 9/2008 | Fowler et al. ................ 345/422 |
| 2008/0273029 A1 * | 11/2008 | Brennan ...................... 345/420 |

* cited by examiner

*Primary Examiner* — Jacinta M Crawford
(74) *Attorney, Agent, or Firm* — Artegis Law Group, LLP (57) ABSTRACT

One embodiment sets forth a method for associating each stencil value included in a stencil buffer with multiple fragments. Components within a graphics processing pipeline use a set of stencil masks to partition the bits of each stencil value. Each stencil mask selects a different subset of bits, and each fragment is strategically associated with both a stencil value and a stencil mask. Before performing stencil actions associated with a fragment, the raster operations unit performs stencil mask operations on the operands. No fragments are associated with both the same stencil mask and the same stencil value. Consequently, no fragments are associated with the same stencil bits included in the stencil buffer. Advantageously, by reducing the number of stencil bits associated with each fragment, certain classes of software applications may reduce the wasted memory associated with stencil buffers in which each stencil value is associated with a single fragment.

20 Claims, 6 Drawing Sheets

TECHNIQUES FOR OPTIMIZING STENCIL BUFFERS

BACKGROUND OF THE INVENTION

1. Field of the Invention

Embodiments of the present invention relate generally to graphics processing and, more specifically, to techniques for optimizing stencil buffers.

2. Description of the Related Art

Some conventional graphics processing units (GPUs) include different processing engines configured to operate in parallel with one another to implement a graphics processing pipeline. A graphics processing pipeline is the collection of processing steps performed to transform 3-D images into rendered 2-D images. When a given processing engine finishes processing data, that processing engine may copy the processed data from local memory to a memory that is shared between the different processing engines within the GPU. Other processing engines may then access the processed data and then perform additional processing operations with that data. One type of data structure used in a graphics processing pipeline to allow different processing engines to access that data is a stencil buffer.

Stencil buffers include stencil values associated with each pixel or sample included in an image surface. Typically, each stencil value is an unsigned integer represented by 8 bits. The meaning and use of the stencil values varies by application. But, in general, stencil values are compared with reference values as part of stencil tests. The outcome of a particular stencil test is often coupled with a depth test and the result determines whether a sample is discarded. This result may also be used to control the updating of the stencil value. In operation, the stencil buffer is often used to identify a set of samples in one render pass and then control the fate of the identified samples and the updating of the associated stencil values in subsequent render passes.

In addition to well-known operations, such as limiting the rendering area, the stencil buffer may be used in a variety of different algorithms. For some classes of algorithms the stencil values included in the stencil buffer are used as binary switches—the stencil value associated with each sample is either on or off. In subsequent rendering passes, the samples associated with stencil values that are on are processed in an application-specific manner. In addition, the stencil values that are off are typically discarded. For instance, even-odd path rendering may be implemented using a stencil-then-cover algorithm where stencil values are assigned either a '1' or a '0.' In even-odd path rendering, if an odd number of path edges lie between the sample and the outside of the shape, then the sample is considered to be inside the shape. Conversely, if an even number of path edges lie between the sample and the outside of the shape, then the sample is considered to be outside the shape. In a first rendering pass, the stencil values corresponding to all of the samples within the path are assigned a '1.' In a second rendering pass, the samples associated with stencil values equal to '1' are colored, and the samples associated with stencil values equal to '0' are discarded.

One limitation to using stencil buffers in a binary fashion is that the stencil buffer requires a relatively large amount of sparsely-accessed memory. For example, suppose that each pixel included 16 samples and an algorithm were to use a stencil buffer in a binary fashion. In such a scenario, the stencil buffer corresponding to each surface would include 128 bits per pixel, but the algorithm would only utilize 16 bits per pixel. Consequently, 122 bits per pixel of memory would be wasted. Because the local memory capacity of GPUs is limited, such memory wastage is undesirable. The negative impact of wasted memory is particularly noticeable for systems that include relatively small local memories, such as those in low cost mobile environments.

As the foregoing illustrates, what is needed in the art is a more effective technique for implementing stencil buffers.

SUMMARY OF THE INVENTION

One embodiment of the present invention sets forth a method for associating fragments with stencil bits included in stencil values. The method includes subdividing a first surface into partitions based on a number of stencil bits defined per fragment; associating a first partition included in the partitions with a first stencil mask that includes a first number of bits equal to the number of stencil bits defined per fragment; mapping surface coordinates of a first fragment to a first virtual address included in a virtual address space, where the first fragment resides within the first partition; selecting a first stencil value based on the first virtual address; and performing a logical operation between the first stencil mask and the first stencil value to associate the first fragment with the first number of bits included in the first stencil mask.

One advantage of the disclosed techniques is that stencil buffers are optimally-sized based on the requirements of the software application. In particular, the amount of physical memory used to store stencil buffers is reduced for software applications that require less than the nominal, prior-art number of stencil bits per sample. Thus, the amount of wasted memory may be dramatically reduced for such software applications.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

Figure 1:
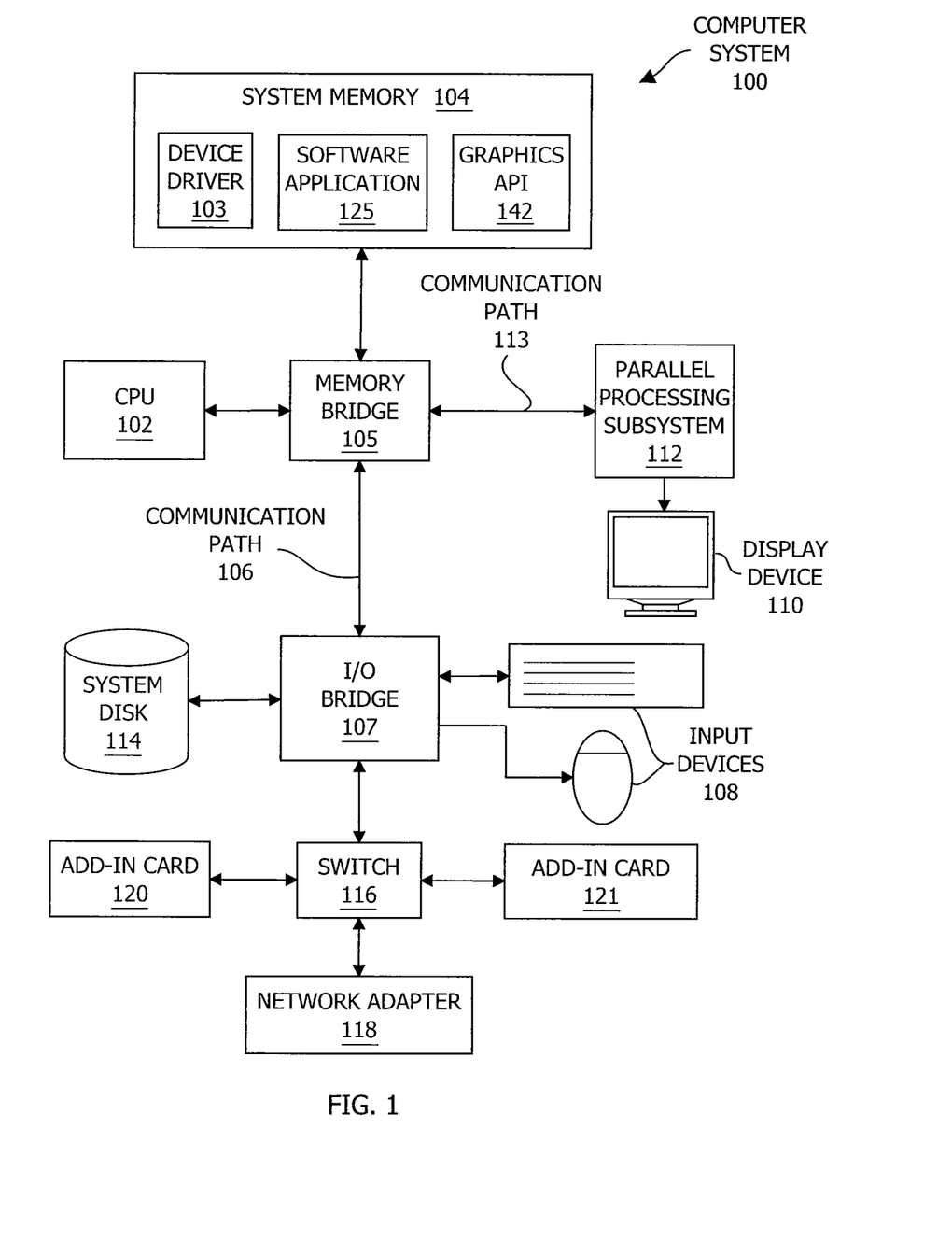
FIG. 1 is a block diagram illustrating a computer system configured to implement one or more aspects of the present invention.

FIG. 1 is a block diagram illustrating a computer system 100 configured to implement one or more aspects of the present invention. As shown, computer system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In operation, I/O bridge 107 is configured to receive user input information from input devices 108, such as a keyboard or a mouse, and forward the input information to CPU 102 for processing via communication path 106 and memory bridge 105. Switch 116 is configured to provide connections between I/O bridge 107 and other components of the computer system 100, such as a network adapter 118 and various add-in cards 120 and 121.

As also shown, I/O bridge 107 is coupled to a system disk 114 that may be configured to store content and applications and data for use by CPU 102 and parallel processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbrige chip. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 comprises a graphics subsystem that delivers pixels to a display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. Such circuitry may be incorporated across one or more parallel processing units (PPUs) included within parallel processing subsystem 112. In other embodiments, the parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and compute processing operations. System memory 104 includes at least one device driver 103 configured to manage the processing operations of the one or more PPUs within parallel processing subsystem 112.

In various embodiments, parallel processing subsystem 112 may be integrated with one or more other the other elements of FIG. 1 to form a single system. For example, parallel processing subsystem 112 may be integrated with CPU 102 and other connection circuitry on a single chip to form a system on chip (SoC).

In operation, the CPU 102 is the master processor of the computer system 100, controlling and coordinating operations of other system components. In particular, the CPU 102 issues commands that control the operation of the parallel processing subsystem 112. Those commands may originate within a software application 125 resident in the system memory 104 and executing on the CPU 102. Advantageously, the parallel processing subsystem 112 may execute commands asynchronously relative to the operation of the CPU 102. A graphics application programming interface (API) 142 is also resident in the system memory 104. The graphics API 142 includes calls and libraries that expose parallel processing subsystem 112 functionality to application developers. Among other things, the graphics API 142 enables application developers to tailor the software application 125 to optimize the way the parallel processing subsystem 112 functions. In general, the software application 125 issues calls to the graphics API 142 to produce a desired set of results using components included in the parallel processing subsystem 112. In alternate embodiments, the graphics API may be replaced with any software program that exposes parallel processing subsystem functionality. For example, the graphics API may be replaced with a different general-purpose API. Further, the graphics API may be configured to inter-operate with one or more additional software APIs.

It will be appreciated that the system shown herein is illustrative and that variations and modifications are possible. The connection topology, including the number and arrangement of bridges, the number of CPUs 102, and the number of parallel processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other alternative topologies, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, switch 116 could be eliminated, and network adapter 118 and add-in cards 120, 121 would connect directly to I/O bridge 107.

Figure 2:
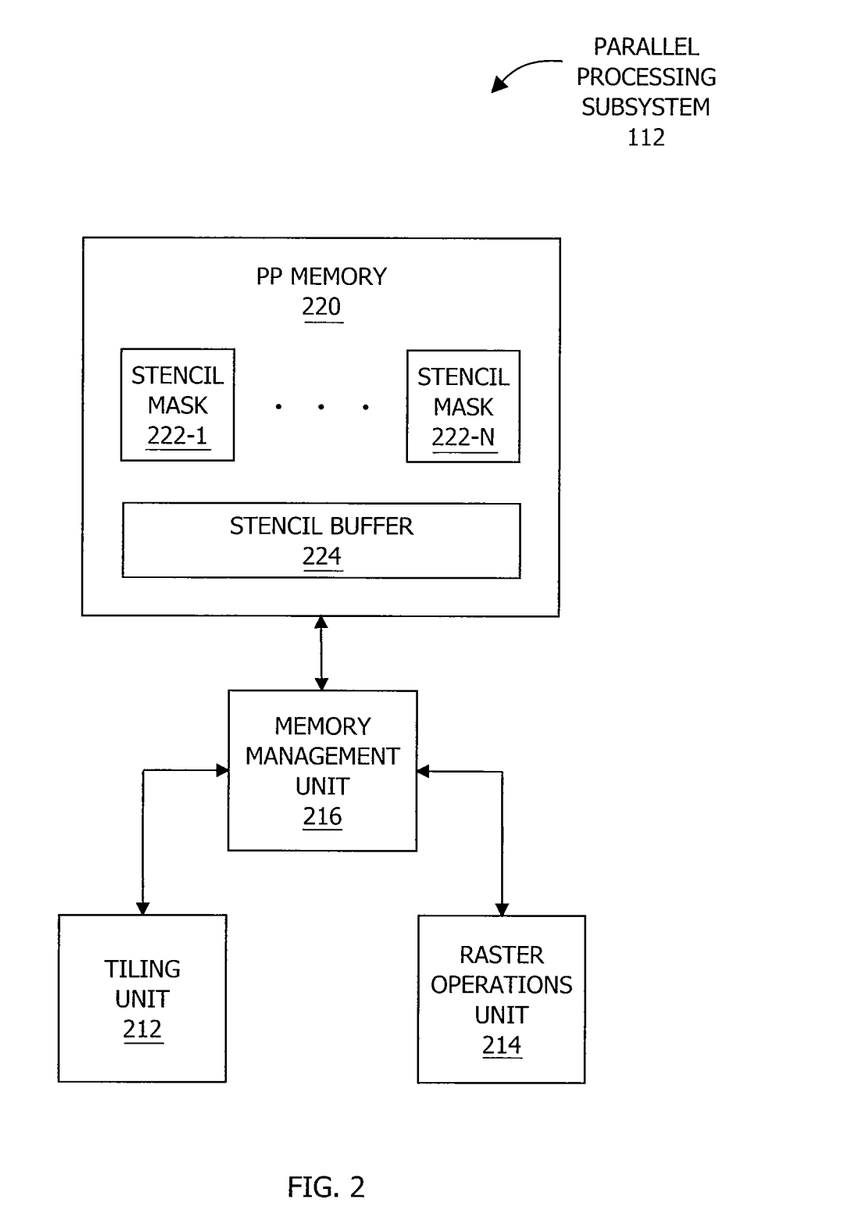
FIG. 2 is a conceptual diagram illustrating the parallel processing subsystem of FIG. 1 in greater detail, according to one embodiment of the present invention.

FIG. 2 is a conceptual diagram illustrating the parallel processing subsystem 112 of FIG. 1 in greater detail, according to one embodiment of the present invention. As shown, the parallel processing subsystem 112 includes, without limitation, a parallel processing (PP) memory 220, a memory management unit 216, a tiling unit 212, and a raster operations unit (ROP unit) 214. The parallel processing subsystem 112 may be implemented using one or more integrated circuit devices, such as programmable processors, application specific integrated circuits (ASICs), or memory devices, or in any other technically feasible fashion. The memory management unit (MMU) 216 is configured to map virtual addresses into physical addresses. The MMU 216 includes a set of page table entries (PTEs) used to map a virtual address to a physical address of a tile or memory page and optionally a cache line index. To ensure optimal memory efficiency, the CPU 102 or units included in the parallel processing subsystem 112 may issue calls to control and coordinate some of the PP memory 220 related operations of the MMU 216.

In some embodiments, one or more PPUs (not explicitly shown in either FIG. 1 or FIG. 2) included within the parallel processing subsystem 112 comprise a graphics processing unit (GPU). The GPU may be configured to implement a graphics processing pipeline to perform various operations related to generating pixel data based on graphics data supplied by CPU 102 and/or system memory 104. Further, the graphics processing pipeline may comprise a world space pipeline and a screen space pipeline. The world space pipeline processes graphics objects in 3D space, where the position of each graphics object is known relative to other graphics objects and relative to a 3D coordinate system. The screen space pipeline processes graphics objects that have been projected from the 3D coordinate system onto a 2D planar surface representing the surface of the display device 110.

A tiling unit 212 included in the parallel processing subsystem 112 is a graphics primitive sorting engine that resides between the world space pipeline and the screen space pipeline. Graphics primitives are processed in the world space pipeline and then transmitted to the tiling unit 212. The screen space is divided into cache tiles, where each cache tile is associated with a portion of the screen space. The size of a cache tile may be based on a number of factors, including the quantity and configuration of render targets associated with the screen space, the quantity of samples per pixel, and whether the data stored in the cache tile is compressed. As a general matter, a cache tile is sized to increase the likelihood that the cache tile data remains resident in the cache memory of the parallel processing subsystem 112 until all graphics primitives associated with the cache tile are fully processed.

For each graphics primitive, the tiling unit 212 identifies the set of cache tiles that intersect with the graphics primitive, a process referred to herein as "tiling." After tiling a certain number of graphics primitives, the tiling unit 212 processes the graphics primitives on a cache tile basis, where graphics primitives associated with a particular cache tile are transmitted to screen space pipeline. The tiling unit 212 transmits graphics primitives to the screen space pipeline one cache tile at a time. Graphics primitives that intersect with multiple cache tiles are typically processed once in the world space pipeline, but are then transmitted multiple times to the screen space pipeline. Each cache tile is further divided into multiple raster tiles. Consequently, each raster tile represents a portion of the portion of the screen space represented by a cache tile. The processing of the different raster tiles within a given cache tile may be distributed among any processing entities included within computer system 100 in any technically feasible manner.

Within the screen space pipeline, one of the components that operates on raster tiles is a raster operations unit (ROP unit) 214. The ROP unit 214 is a processing unit that performs raster operations, such as stencil, z test, blending, and the like, and transmits pixel data as processed graphics data for storage in graphics memory, where graphics memory is typically structured as one or more render targets. The processed graphics data may be stored in graphics memory, the PP memory 220, or the system memory 104 for display on the display device 110 or for further processing by the CPU 102 or the parallel processing subsystem 112. In some embodiments, the ROP unit 214 is configured to compress z or color data that is written to memory and decompress z or color data that is read from memory.

When processing graphics data, the PP memory 220 can be used as graphics memory that stores one or more conventional frame buffers and, if needed, one or more other render targets as well. Among other things, the PP memory 220 may be used to store and update pixel data and deliver final pixel data or display frames to the display device 110 for display. As shown, the PP memory 220 includes a stencil buffer 224 that is configured as a render target. The stencil buffer 224 includes stencil information associated with samples corresponding to screen space coordinates. As also shown, the PP memory 220 includes multiple stencil masks 222. In particular, the PP memory 220 includes a number N of stencil masks 222 where N≥2. (Herein, multiple instances of like objects are denoted with reference numbers identifying the object and parenthetical numbers identifying the instance where needed.)

The stencil buffer 224 is typically organized into 8-bit stencil values. The ROP unit 214 is configured to operate upon the 8-bit stencil values in conjunction with the stencil masks 222. As outlined previously herein, in prior-art systems, each 8-bit stencil value is typically associated with a single fragment, such as a sample or a pixel. However, many software applications 125 implement algorithms that involve fewer than 8 bits of the stencil buffer 224 per sample. In particular, some software applications 125 require only binary stencil functionality. Irrespective of the software application, prior-art systems often allocate the amount of physical memory required to store 8 stencil bits per sample. Advantageously, the parallel processing subsystem 112 allocates the amount of physical memory required to store only an application-specific number of stencil bits per sample. In particular, the graphics API 142 includes calls that expose this additional flexibility to the software application 125, thereby allowing the software application 125 to specify the number of stencil bits per sample to include in the stencil buffer 224. In operation, the graphics processing pipeline is configured to generate and apply the stencil masks 222 to associate the 8 bits included in each 8-bit stencil value with different samples.

More specifically, a unit within the graphics processing pipeline receives the number of stencil bits per sample and then associates the samples, the stencil buffer 224, and the stencil masks 222 based on the number of stencil bits per sample. In one embodiment, the tiling unit 212 receives the number of stencil bits per sample. The tiling unit 212 then determines the number of samples per stencil value by computing the number of samples that each individual 8-bit stencil value has the capacity to uniquely represent. For example, if the number of stencil bits per sample were 1, then each individual 8-bit stencil value would have the capacity to uniquely represent 8 samples and the samples per stencil value would be 8. If the number of stencil bits per sample were 2, then the samples per stencil value would be 4, and so forth. The tiling unit 212 then creates a set of stencil masks 222. The total number of stencil masks 222 equals the samples per stencil value, and each of the stencil masks 222 selects a different subset of 8 total bits. For instance, if the number of stencil bits per sample were 1, then the stencil masks 222-1 through 222-8 would be 0b00000001, 0b00000010, 0b00000100, 0b00001000, 0b00010000, 0b00100000, 0b01000000, and 0b10000000. Alternatively or additionally, the stencil masks 222 can be stored in registers within the parallel processing subsystem.

Subsequently, the tiling unit 212 receives a surface, generally via receiving parameters such as location in PP memory 220, dimensions, etc. The tiling unit 112 subdivides the surface into regions, where the number of regions equals the number of stencil masks 222 and each region is associated with a different stencil mask 222. Upon receiving a sample, the tiling unit 212 uses the (x, y) screen space coordinates associated with the sample to select the region of the surface that includes the sample. The tiling unit 212 then outputs the stencil mask 222 associated with the selected region, thereby associating the stencil mask 222 with the sample. The associated stencil value is assigned based on the virtual address of the stencil buffer 222 corresponding to the (x, y) screen space coordinates associated with the sample. Notably, if tile caching is enabled, then the tiling unit 212 is configured to compute and output the stencil mask 222 only once per cache tile based on the (x, y) screen space coordinates associated with the cache tile.

In this fashion, the tiling unit 212 associates the stencil masks 222 and the samples to ensure that each bit included in the stencil buffer 224 is associated with only a single sample. In particular, each region of the surface corresponds to a different subset of bits in each 8-bit sample value. To optimize memory usage, the page table entries (PTEs) included in the MMU 216 are configured such that the virtual address space of the stencil buffer 224 corresponding to each region in the surface maps to the same physical address space. Consequently, the physical memory allocated to the stencil buffer 224 is proportional to the number of stencil bits per sample. For example, suppose that the software application 125 were to specify 1 stencil bit per sample. The amount of PP memory 220 that the parallel processing subsystem 112 would dedicate to the stencil buffer 222 would be one-eighth the amount of PP memory 220 that a prior-art system would dedicate to the stencil buffer 222.

After the tiling unit 212 outputs the appropriate stencil mask 222, subsequent units in the graphics processing pipeline apply the stencil mask 222 when performing any stencil actions involving the sample associated with the stencil mask 222. Stencil actions include any types of action performed using the stencil buffer 222, such as stencil tests, stencil comparisons, stencil operations, stencil value reads, stencil value writes, etc. In general, existing functionality included within the graphics processing pipeline ensures that only the subset of bits specified by the stencil mask 222 are accessed in conjunction with the associated sample. For example, before performing any stencil action, the ROP unit 214 performs a bitwise logical AND operation of the stencil mask 222 and the stencil value associated with the sample and included in the stencil buffer 224. Further, before performing a stencil test between the stencil value and a reference stencil value, the ROP unit 214 also performs a bitwise logical AND operation of the stencil mask 222 and the reference stencil value. Advantageously, by leveraging the existing stencil functionality, the changes to existing units included in the graphics processing pipeline are minimized.

In some embodiments, the ROP unit 214 or the device driver 103 may include functionality that tailors stencil actions to reflect the number of stencil bits per sample. For example, suppose that the number of stencil bits per sample were 1. In such a scenario, the ROP unit 214 would implement both an increment stencil operation and a decrement stencil operation using an inversion stencil operation. As another example, if the number of stencil bits per sample were 2, the ROP unit 214 would implement two-bit arithmetic for an increment stencil operation and a decrement stencil operation.

In alternate embodiments, the graphics processing pipeline may be configured to operate on a pixel or group of pixel instead of a sample. In such a scenario, the bits in each 8-bit stencil value may be associated with different pixels or group of pixels instead of different samples.

It will be appreciated that the system shown herein is illustrative and that variations and modifications are possible. For example, within the parallel processing subsystem 112, any units or combination of units may be configured to receive the stencil bits per sample and associates the bits in each stencil value with different samples in any technically feasible manner. In particular, instead of dividing the surface into a number of regions equal to the number of stencil masks, units within the parallel processing subsystem may further subdivide the regions. Finer levels of interleaving partitions may provide better cache locality in the ROP unit 214.

Figure 3:
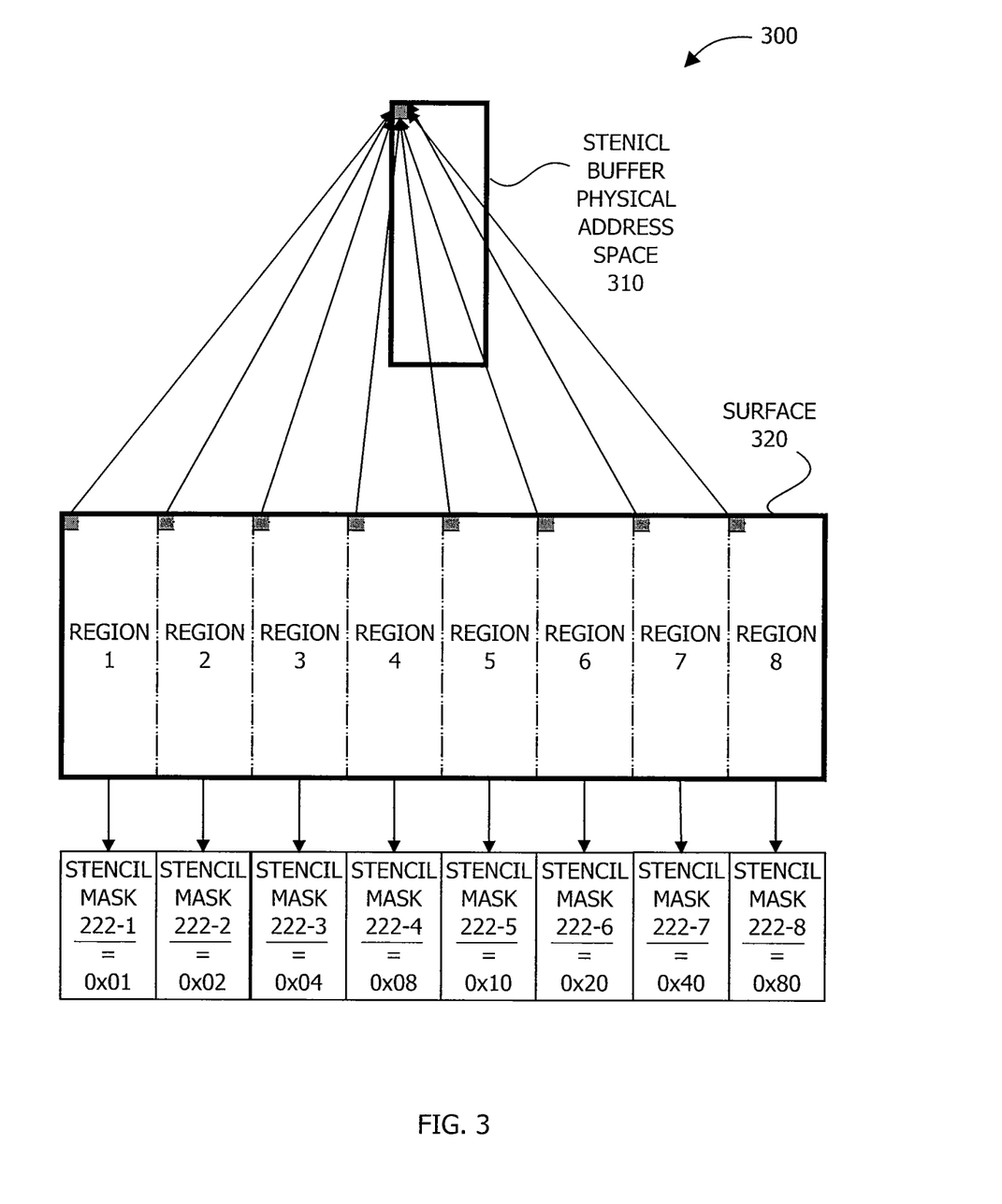
FIG. 3 is a conceptual diagram of a surface and a corresponding stencil buffer physical address space and stencil masks of FIG. 2, according to one embodiment of the present invention.

FIG. 3 is a conceptual diagram of a surface 320 and a corresponding stencil buffer physical address space 310 and stencil masks 222 of FIG. 2. The tiling unit 212 (not shown in FIG. 3) receives an instruction to designate 1 stencil bit per sample. Consequently, the tiling unit 212 divides the surface 320 into 8 separate regions based on the (x, y) screen space coordinates of the surface 320. Further, the tiling unit 212 uses eight separate stencil masks 222-1 through 222-8 and associates each of the stencil masks 222 with a different region of the surface 320. The ROP 214 is configured to operate on 8-bit stencil values included in the stencil buffer 224. However, as shown, each of the stencil masks 222-1 through 222-8 selects a separate bit in each stencil value.

The tiling unit 212 sets the stencil mask 222-1 to select the least significant bit (0x01) included in the stencil value. In addition, the tiling unit 212 associates the stencil mask 222-1 with the first region of the surface 320. By associating the stencil mask 222-1 with the first region of the surface 320, the tiling unit 212 also associates any samples or cache tiles that lie within the first region in screen space with the first stencil mask 222-1. Thus, subsequent stencil actions associated with any sample that lies within the first region in screen space access only the least significant bit of the corresponding stencil value.

In contrast, the tiling unit 212 sets the stencil mask 222-8 to select the most significant bit (0x80) included in the stencil value. In addition, the tiling unit 212 associates the stencil mask 222-8 with the eighth region of the surface 320. By associating the stencil mask 222-8 with the eighth region of the surface 320, the tiling unit 212 also associates any samples or cache tiles that lie within the eighth region in screen space with the eight stencil mask 222-8. Thus, subsequent stencil actions associated with any sample that lies within the eighth region in screen space access only the most significant bit of the corresponding stencil value.

In a similar fashion, each of the remaining stencil masks 222-2 through 222-7 selects a single, different intermediate bit included in the stencil value. And each of these stencil masks 222 is associated with an intermediate region of the surface 320. In this fashion, samples that lie within different regions of the partitioned surface 320 are associated with a different individual bit included in the stencil values. The specific stencil value associated with each sample is determined by the (x, y) screen space coordinates corresponding to the sample.

The surface 320 corresponds to the virtual address space of the stencil buffer 224. The virtual address space includes a different virtual address for each sample included in the surface 320. However, the tiling unit 212 configures the page table entries included in the MMU 216 such that the virtual address spaces of the stencil buffer 224 corresponding to region 1 through region 8 all map to the same stencil buffer physical address space 310. Consequently, as shown, the stencil buffer physical address space 310 is one-eighth the size of the virtual address space corresponding to the surface 320. The MMU 216 allocates the PP memory 220 based on the stencil buffer physical address space 310. Thus the PP memory 220 footprint that the MMU 216 allocates for the stencil buffer 224 is one-eighth the size of the PP memory 220 footprint that a MMU included in a prior-art system would allocate for the stencil buffer 224.

As shown, the virtual addresses of the first stencil value included in each of the regions 1 through 8 all map to the address of the first stencil value in the stencil buffer physical address space 310. As also shown, each of the first stencil values included in each of the regions is associated with a different stencil mask 222. Thus, the sample corresponding to the first virtual address included in region 1 of the surface 320 is associated with the LSB of the first stencil value included in the stencil buffer 224. Similarly, the sample corresponding to the first virtual address included in region 8 of the surface 320 is associated with the MSB of the first stencil value included in the stencil buffer 224. Advantageously, by strategically assigning the stencil masks 222 and overlapping regions of the virtual address space in the stencil buffer physical address space 310, the tiling unit 212 preserves the integrity of the stencil buffer 224. More specifically, the tiling unit 212 ensures that each of the bits included in the stencil buffer 224 is accessed in conjunction with stencil operations associated with only one particular sample.

Figure 4:
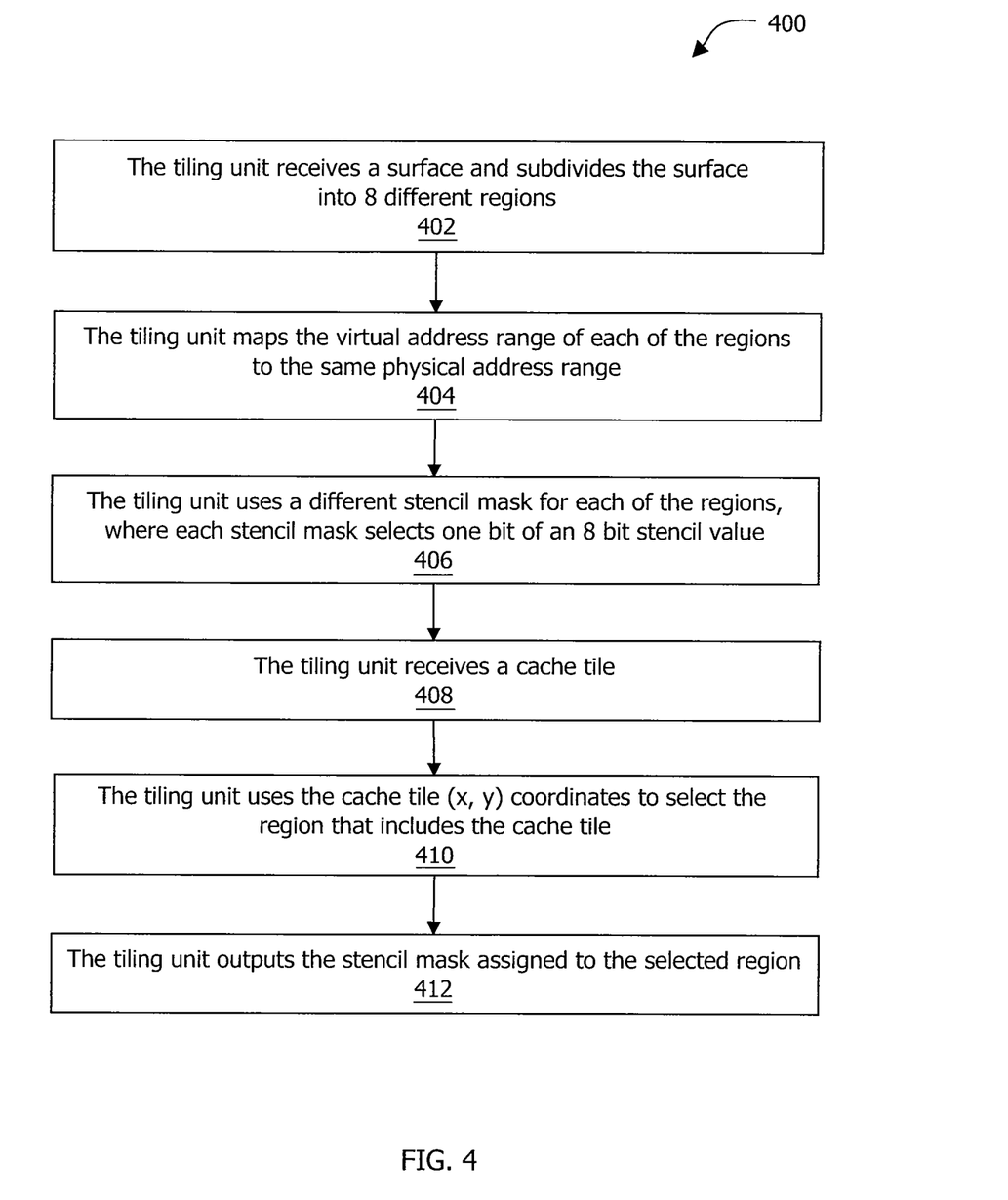
FIG. 4 is a flow diagram of method steps for associating each sample included in a cache tile with a single stencil bit, according to one embodiment of the present invention.

FIG. 4 is a flow diagram of method steps for associating each sample included in a cache tile with a single stencil bit, according to one embodiment of the present invention. Although the method steps are described in conjunction with the systems of FIGS. 1-3, persons skilled in the art will understand that any system configured to implement the method steps, in any order, falls within the scope of the present invention.

As shown, a method 400 begins at step 402, where the tiling unit 212 receives the surface 320 and subdivides the surface 320 into 8 different regions. In alternate embodiments, a different number of regions may be used. The tiling unit 212 may subdivide the surface 320 in any technically feasible fashion. For instance, the tiling unit 212 may subdivide the surface 320 based on the (x, y) screen space coordinates. In alternate embodiments, the tiling unit 212 may subdivide the surface 320 based on the virtual addresses corresponding to samples represented by the surface 320. At step 404, the tiling unit 212 configures the MMU 216 to map the virtual address range of each of the 8 different regions to the same physical address range. As a result, each sample is associated with the stencil value whose physical memory location is specified by the offset of the coordinates of the sample relative to the first coordinates of the region in which the sample lies. Advantageously, the entire physical address range is the same size as the virtual address range corresponding to a single region in the surface 320. In other words, the physical address range is one-eighth the size of the virtual address range corresponding to the entire surface 320.

At step 406, the tiling unit 212 uses a different stencil mask 222 to each of the 8 regions. Each of the stencil masks 222 selects a different individual bit of an 8-bit stencil value. In this fashion, the tiling unit 212 ensures that each sample included in the surface 320 is uniquely associated with a single bit included in the stencil buffer 224 and backed by the PP memory 220.

At step 408, the tiling unit 212 receives a cache tile. At step 410, the tiling unit 212 uses the (x, y) screen space coordinates of the cache tile to select the region of the surface 320 that includes the cache tile. At step 412, the tiling unit 212 outputs the stencil mask 222 assigned to the selected region. Advantageously, the tiling unit 212 is configured to output the stencil mask 222 for each cache tile instead of for each sample, thereby streamlining the graphics processing pipeline.

Persons of ordinary skill in the art will understand that various modifications and changes may be made to optimize different processing steps included in the graphics processing pipeline. In particular, the ROP unit 214 instead of the tiling unit 212 may be configured to generate the stencil masks 222. Further, the ROP unit 214 may be configured to vary the stencil masks 222 per raster tile instead of per partition, thereby optimizing the cache locality of the ROP unit 214. In one embodiment, the ROP unit 214 is configured to determine the stencil masks 222 based on a virtual address associated with a stencil raster tile.

Figure 5:
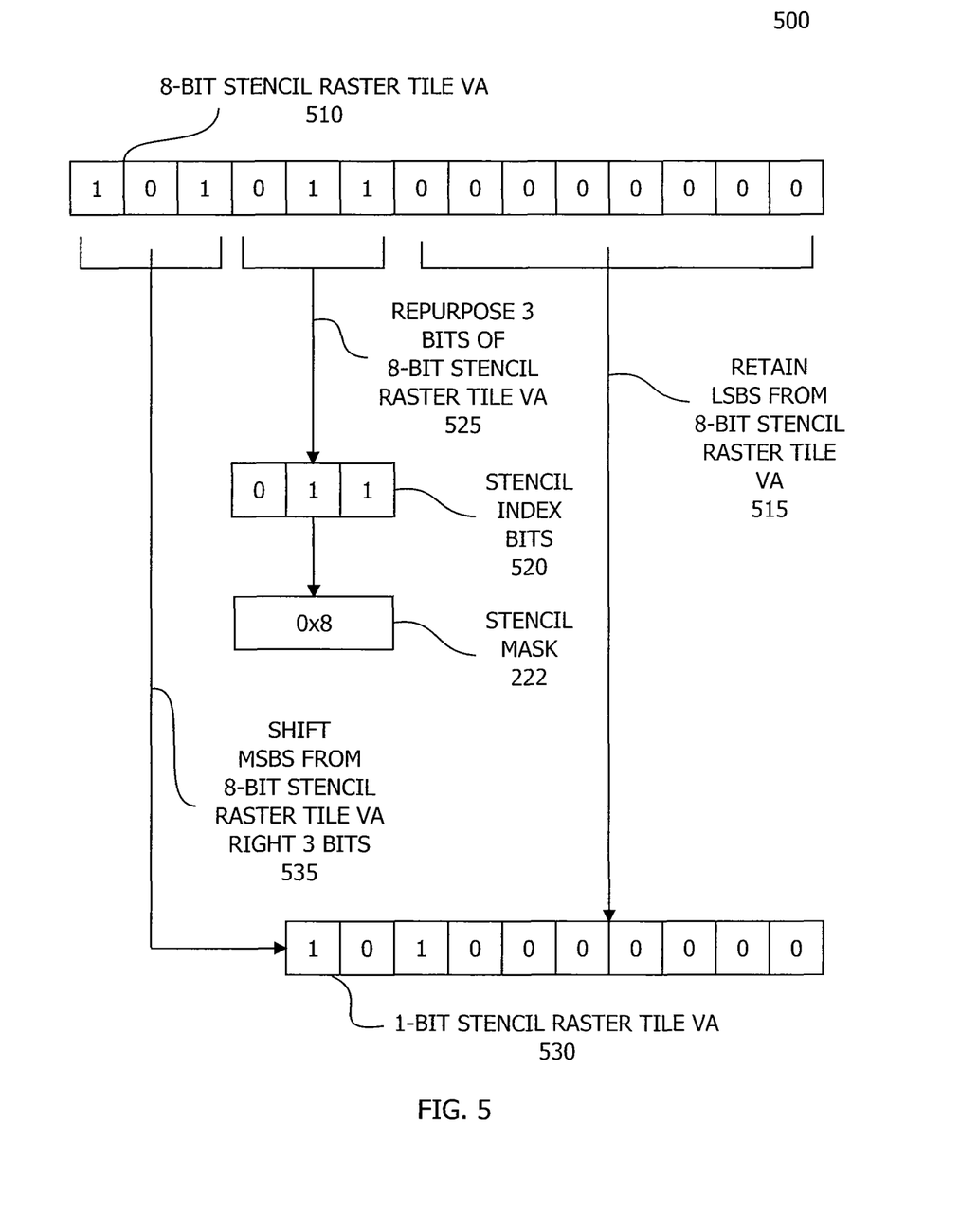
FIG. 5 is a conceptual diagram illustrating how a virtual address associated with a stencil raster tile is partitioned into the stencil mask and a new virtual address, according to another embodiment of the present invention.

FIG. 5 is a conceptual diagram illustrating how a virtual address associated with a stencil raster tile is partitioned into the stencil mask 222 and a new virtual address, according to another embodiment of the present invention. In the exemplary parallel processing subsystem 112 corresponding to FIG. 5, the ROP unit 214 (not shown) is configured to use the stencil masks 222 to associate the bits in each stencil value with different samples. The exemplary tiling unit 212 corresponding to FIG. 5 does not include any functionality associated with the stencil masks 222 of FIG. 2.

The ROP unit 214 receives a software application 125 specification of 1 stencil bit per sample. Further, as shown the ROP unit 214 receives the 8-bit stencil raster tile virtual address (VA) 510. Instead of assigning the stencil mask 222 based on the (x, y) screen coordinates of the 8-bit stencil raster tile VA 510, the ROP unit 214 decomposes the 8-bit stencil raster tile VA 510 into the stencil mask 222 and a 1-bit stencil raster tile VA 530.

Notably, as shown, the ROP unit 214 decomposes the 8-bit stencil raster tile VA 510 into three separate sets of bits. The least significant bits are grouped together as a first set of bits and represent a virtual address internal to a raster tile. Consequently, the number of bits included in the first set of bits is equal to the number of bits required to represent an entire raster tile. Because the 8-bit stencil rater tile VA 510 is aligned to a stencil tile boundary, the bits included in the first set of bits are all zero. In alternate embodiments, the number of bits included in the first set of bits may exceed the number of bits required to represent an entire raster tire. The next three bits are grouped together as a second set of bits—the stencil index bits 520. Finally, the remaining, most significant bits are grouped together as a third set of bits.

As shown, the ROP unit 214 is configured to "retain LSBs from 8-bit stencil raster tile VA" 515. In operation, the ROP unit 214 uses the first set of bits as the LSB bits of the corresponding 1-bit stencil raster tile VA 530 without altering the bits. As also shown, the ROP unit 214 is configured to "shift MSBs from 8-bit stencil raster tile VA right 3 bits" 535. First, the ROP unit 214 performs a bitwise shift operation, shifting the third set of bits to the right by three bits. Second, the ROP unit 214 prepends the third, shifted set of bits to the first set of bits, forming the entire 1-bit stencil raster tile VA 530. As shown, the 1-bit stencil raster tile VA 530 is 3 bits smaller than the original 8-bit stencil raster tile VA 510. Consequently, the virtual address space 320 corresponding to the 1-bit stencil raster tile VA 530 is one-eighth the size of the virtual address space 320 corresponding to the 8-bit stencil raster tile VA 510.

The ROP unit 214 is also configured to "repurpose 3 bits of the 8-bit stencil raster tile VA" 525. In operation, the ROP unit 214 uses the second set of bits, the 3 stencil index bits 520, to create the stencil mask 222. More specifically, the ROP unit 214 computes the stencil mask 222 by performing a bitwise shift operation, shifting the bit '1' to the left by the value of the stencil index bits 520. For example, as shown, the ROP unit 214 repurposes the exemplary stencil index bits 520 "0b011"

by performing a bitwise shift operation, shifting '1' to the left by 3. The ROP unit 214 assigns the results of this bitwise shift operation, 0x8, to the stencil mask 222. This stencil mask 222 selects a single bit included in an 8 bit stencil value corresponding to the 1-bit stencil raster tile VA 530. In this fashion, the ROP unit 214 is configured to convert each 8-bit stencil raster tile VA 510 into a unique combination of the stencil mask 222 and the 1-bit stencil raster tile VA 530. Consequently, each 8-bit stencil raster tile VA 510 selects a unique bit included in the stencil buffer 224.

Advantageously, the MMU 216 allocate PP memory 220 for the 1-bit stencil raster tile VA 530, not the 8-bit stencil raster tile VA 510. Consequently, the amount of PP memory 220 that the MMU 216 allocates for the stencil buffer 224 is one-eighth smaller than the amount of PP memory 220 that a MMU included in a prior-art system would allocate for the stencil buffer 224. Further, the computed 1-bit stencil raster tile VAs 530 typically associate samples that are adjacent in screen space with adjacent stencil values. Advantageously, this provides good coherence in the mini-cache associated with the ROP unit 214.

As is apparent to one skilled in the art, the techniques disclosed herein may be applied to various different types of fragments and to various numbers of stencil bits. For instance, in alternate embodiments, the ROP unit 214 may be configured to assign any number of stencil bits per sample. Further, the parallel processing pipeline, including the ROP unit 214, may be configured to perform stencil actions associated with separate pixels or separate groups of pixels instead of separate samples.

Figure 6:
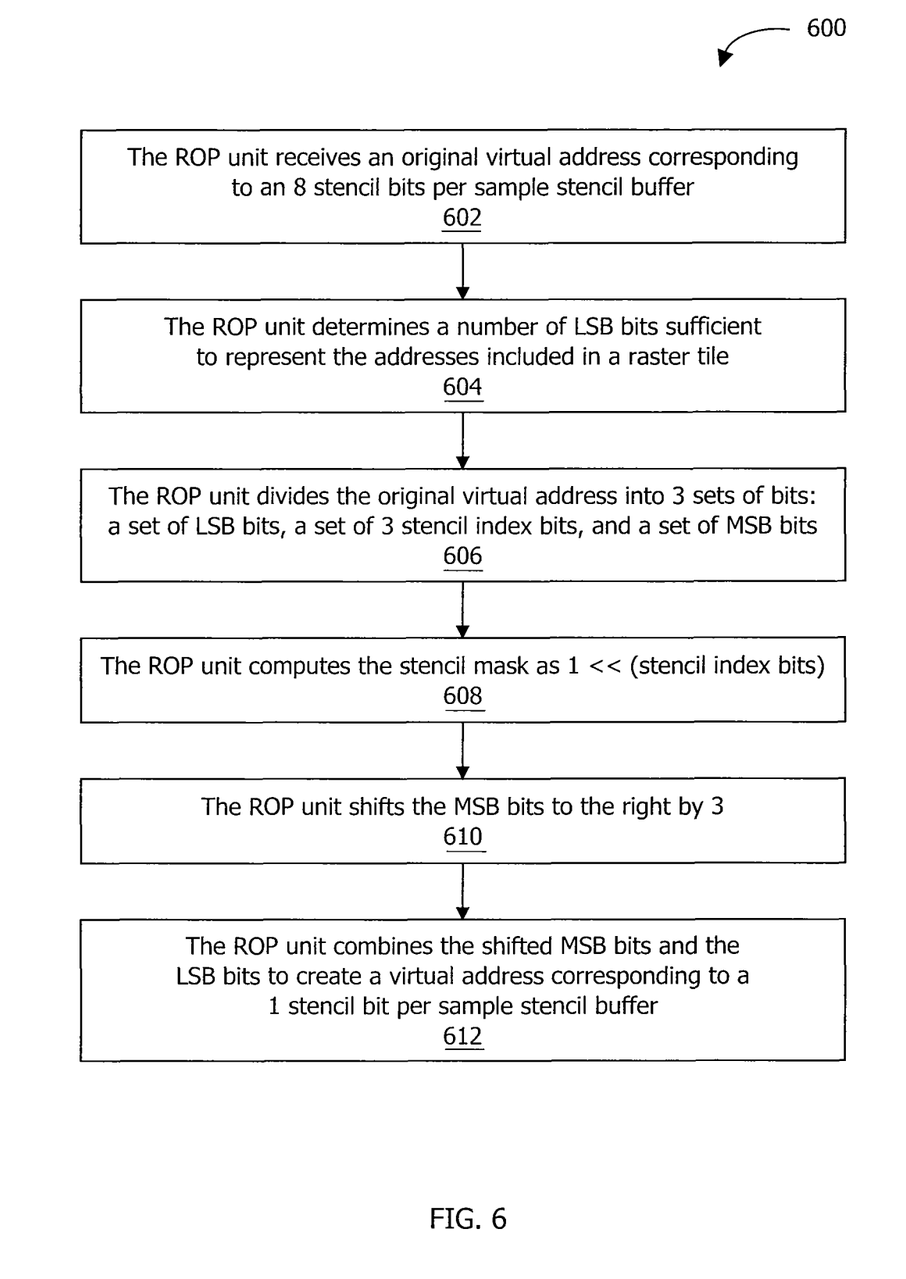
FIG. 6 is a flow diagram of method steps for generating a virtual address and a stencil mask that associate a sample with a single stencil bit, according to one embodiment of the present invention.

FIG. 6 is a flow diagram of method steps for generating a virtual address and a stencil mask that associate a sample with a single stencil bit, according to one embodiment of the present invention. Although the method steps are described in conjunction with the systems of FIGS. 1-2 and 5, persons skilled in the art will understand that any system configured to implement the method steps, in any order, falls within the scope of the present invention.

As shown, a method 600 begins at step 602, where the ROP unit 214 receives an original virtual address (VA) corresponding to an 8 stencil bits per sample stencil buffer 224. At step 604, the ROP unit 214 determines the number of LSB bits sufficient to represent the addresses included in a raster tile. The ROP unit 214 may determine the number of LSB bits in any technical feasible fashion. For example, the ROP unit 214 may compute the log (base 2) of the number of addresses included in the raster tile and round this value up to determine the number of LSB bits.

At step 606, the ROP unit 214 divides the original virtual address into 3 sets of bits: a set of LSB bits, a set of 3 stencil index bits 520, and a set of MSB bits. In particular, the ROP unit 214 assigns the lowest original VA bits to the set of LSB bits, the 3 middle original VA bits to the set of stencil index bits 520, and the remaining bits of the original VA bits to the set of MSB bits. At step 608, the ROP unit 214 computes the stencil mask 222 by performing a bitwise shift operation ('1'<<(stencil index bits)), shifting the bit '1' to the left by the value of the stencil index bits 520.

At step 610, the ROP unit 214 performs a bitwise shift operation, shifting the MSB bits to the right by 3. At step 612, the ROP unit 214 combines the shifted MSB bits and the LSB bits to create a virtual address corresponding to a 1 stencil bit per sample stencil buffer 224. Advantageously, together the stencil mask 222 and the virtual address corresponding to a 1 stencil bit per sample stencil buffer select a single, unique stencil bit included in the stencil buffer 224. Further, the size of the PP memory 220 that the parallel processing subsystem 112 allocates to the stencil buffer 224 is optimized to reflect the number of stencil bits per sample, not the nominal 8 stencil bits per sample included in each stencil value.

In sum, stencil buffers may be more effectively implemented by allowing software applications to specify the number of stencil bits per sample. More specifically, the graphics processing pipeline is configured to create and access an optimally-sized stencil buffer based on the number of stencil bits per sample. In one example, using the techniques disclosed herein, a tiling unit included in the graphics processing pipelines subdivides a surface into 8 regions. The tiling unit then creates a set of 8 stencil masks, where each stencil mask is associated with a different bit and a different region. Upon receiving a cache tile, the tiling unit uses the cache tile screen space coordinates to select the region that includes the cache tile. The tiling unit outputs the stencil mask associated with the selected region. Existing stencil mask functionality supports 8-bit stencil values and corresponding 8-bit stencil masks. Consequently, stencil actions associated with a sample included in the cache tile access only one bit of the stencil value associated with the sample. The tiling unit also configures the MMU to map the range of virtual addresses corresponding to the stencil buffer in each region to the same range of physical addresses. Thus, the physical address space corresponding to the stencil buffer is one-eighth the size of the virtual address space corresponding to the stencil buffer. Because each region selects a different bit in the 8-bit stencil values, no two samples are associated with the same bit in the stencil buffer.

In another example, a ROP unit included in the graphics processing pipeline converts a virtual address corresponding to an 8-bit stencil raster tile into a virtual address corresponding to a 1-bit stencil raster tile and a corresponding stencil mask. More specifically, the ROP unit divides the 8-bit stencil raster tile virtual address into three sets of bits. The first set of bits includes the least significant bits included in the 8-bit stencil raster tile virtual address and represents an address internal to a raster tile. The second set of bits includes 3 intermediate stencil index bits included in the 8-bit stencil raster tile virtual address. The third set of bits includes the remaining, most significant bits included in the 8-bit stencil raster tile virtual address. The ROP unit then creates a stencil mask that selects a single bit based on the stencil index bits. Further, the ROP unit creates a corresponding 1-bit stencil raster tile virtual address based on the set of most significant bits and the set of least significant bits. Only the 1-bit stencil raster tile virtual addresses are backed by physical memory. Consequently, the physical address space associated with the stencil buffer is one-eighth the size of the virtual address range corresponding to 8-bit stencil raster tile virtual addresses. Together, the stencil mask and the 1-bit stencil raster tile virtual address specify a single bit included in the stencil buffer.

Advantageously, by using stencil masks to associate less than 8 stencil bits with each sample, the amount of physical memory used to store the stencil buffer is reduced compared to prior-art techniques. More specifically, the amount of physical memory used to store a stencil buffer is reduced by a factor of 2 to 8, in inverse proportion to the specified number of stencil bits per sample. In particular, if a software application requires only binary stencil buffer functionality, then the software application specifies 1 stencil bit per sample. Using the disclosed techniques, the physical memory allocated for a 1 bit stencil per sample stencil buffer is a factor of 8 smaller than the physical memory allocated for an 8 bit stencil per sample stencil buffer. Consequently, the memory waste associated with the stencil buffer is reduced compared to prior-art techniques in which 8 stencil bits are invariably associated with each sample. Further, in some implementations, the groups of samples associated with each 8-bit stencil value may be selected to optimize cache locality within the ROP unit, thereby optimizing stencil buffer accesses.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of the present invention is determined by the claims that follow.

What is claimed is:

1. A method for associating fragments with stencil bits included in stencil values, the method comprising:
   subdividing a first surface into a plurality of partitions based on a number of stencil bits defined per fragment;
   associating a first partition included in the plurality of partitions with a first stencil mask that includes a first number of bits equal to the number of stencil bits defined per fragment;
   mapping, via a processor, surface coordinates of a first fragment to a first virtual address included in a virtual address space, wherein the first fragment resides within the first partition;
   selecting a first stencil value based on the first virtual address; and
   performing a logical operation between the first stencil mask and the first stencil value to associate the first fragment with the first number of bits included in the first stencil mask.

2. The method of claim 1, further comprising:
   mapping surface coordinates of a second fragment to a second virtual address included in the virtual address space, wherein the second fragment resides within a second partition included in the plurality of partitions; and
   mapping the first virtual address and the second virtual address to a physical address that corresponds to the first stencil value.

3. The method of claim 2, further comprising:
   associating the second partition with a second stencil mask that includes a second number of bits equal to the number of stencil bits defined per fragment;
   selecting the first stencil value based on the second virtual address; and
   performing a logical operation between the second stencil mask and the first stencil value to associate the second fragment with the second number of bits included in the second stencil mask.

4. The method of claim 3, wherein the bits in the first number of bits are separate and distinct from the bits in the second number of bits.

5. The method of claim 4, wherein the first stencil value includes 8 stencil bits.

6. The method of claim 5, wherein the number of stencil bits defined per fragment equals 1.

7. The method of claim 6, wherein at least eight partitions are included in the plurality of partitions.

8. The method of claim 7, further comprising:
   receiving a request to perform an increment stencil operation or a decrement stencil operation with respect to the first fragment; and
   performing an invert stencil operation with respect to the first fragment to satisfy the request.

9. The method of claim 1, wherein the logical operation between the first stencil mask and the stencil value comprises a logical bit-wise AND operation.

10. A non-transitory computer-readable storage medium including instructions that, when executed by a processing unit, cause the processing unit to associate fragments with stencil bits included in stencil values by performing the steps of:
    subdividing a first surface into a plurality of partitions based on a number of stencil bits defined per fragment;
    associating a first partition included in the plurality of partitions with a first stencil mask that includes a first number of bits equal to the number of stencil bits defined per fragment;
    mapping surface coordinates of a first fragment to a first virtual address included in a virtual address space, wherein the first fragment resides within the first partition;
    selecting a first stencil value based on the first virtual address; and
    performing a logical operation between the first stencil mask and the first stencil value to associate the first fragment with the first number of bits included in the first stencil mask.

11. The non-transitory computer-readable storage medium of claim 10, further comprising:
    mapping surface coordinates of a second fragment to a second virtual address included in the virtual address space, wherein the second fragment resides within a second partition included in the plurality of partitions; and
    mapping the first virtual address and the second virtual address to a physical address that corresponds to the first stencil value.

12. The non-transitory computer-readable storage medium of claim 11, further comprising:
    associating the second partition with a second stencil mask that includes a second number of bits equal to the number of stencil bits defined per fragment;
    selecting the first stencil value based on the second virtual address; and
    performing a logical operation between the second stencil mask and the first stencil value to associate the second fragment with the second number of bits included in the second stencil mask.

13. The non-transitory computer-readable storage medium of claim 12, wherein the bits in the first number of bits are separate and distinct from the bits in the second number of bits.

14. The non-transitory computer-readable storage medium of claim 13, wherein the first stencil value includes 8 stencil bits.

15. The non-transitory computer-readable storage medium of claim 14, wherein the number of stencil bits defined per fragment equals 1.

16. The non-transitory computer-readable storage medium of claim 15, wherein at least eight partitions are included in the plurality of partitions.

17. The non-transitory computer-readable storage medium of claim 16, further comprising:
   receiving a request to perform an increment stencil operation or a decrement stencil operation with respect to the first fragment; and
   performing an invert stencil operation with respect to the first fragment to satisfy the request.

18. The non-transitory computer-readable storage medium of claim 10, wherein the logical operation between the first stencil mask and the stencil value comprises a logical bit-wise AND operation.

19. A system configured to associate fragments with stencil bits included in stencil values, the system comprising:
   a tiling unit configured to:
      subdivide a first surface into a plurality of partitions based on a number of stencil bits defined per fragment, and
      associate a first partition included in the plurality of partitions with a first stencil mask that includes a first number of bits equal to the number of stencil bits defined per fragment;
   a software application stored in a memory and configured to:
      map surface coordinates of a first fragment to a first virtual address included in a virtual address space, wherein the first fragment resides within the first partition; and
   a raster operations unit configured to:
      select a first stencil value based on the first virtual address, and
      perform a logical operation between the first stencil mask and the first stencil value to associate the first fragment with the first number of bits included in the first stencil mask.

20. The system of claim 19, wherein the software application is further configured to:
   map surface coordinates of a second fragment to a second virtual address included in the virtual address space, wherein the second fragment resides within a second partition included in the plurality of partitions; and
   map the first virtual address and the second virtual address to a physical address that corresponds to the first stencil value.

* * * * *